US010481661B2

(12) United States Patent
Cooper et al.

(10) Patent No.: US 10,481,661 B2
(45) Date of Patent: Nov. 19, 2019

(54) POWER SUPPLY INTERFACE LIGHT LOAD SIGNAL

(71) Applicant: INTEL CORPORATION, Santa Clara, CA (US)

(72) Inventors: Barnes Cooper, Tigard, OR (US); Vidoot Ponnala Rathnakar, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 22 days.

(21) Appl. No.: 15/086,007

(22) Filed: Mar. 30, 2016

(65) Prior Publication Data

US 2017/0285708 A1    Oct. 5, 2017

(51) Int. Cl.
*G06F 1/32* (2019.01)
*G06F 1/28* (2006.01)

(52) U.S. Cl.
CPC ..................... *G06F 1/28* (2013.01)

(58) Field of Classification Search
CPC ..................... G06F 1/3215
See application file for complete search history.

(56) References Cited

U.S. PATENT DOCUMENTS

| 2003/0009702 A1* | 1/2003 | Park ........................ G06F 1/263 713/300 |
| 2004/0189341 A1* | 9/2004 | Liu ........................... G06F 1/26 324/750.3 |
| 2005/0184713 A1* | 8/2005 | Xu .......................... H02M 3/156 323/282 |
| 2006/0248366 A1 | 11/2006 | Schumacher et al. |
| 2008/0157597 A1* | 7/2008 | Pratt ........................ H02J 1/08 307/31 |
| 2008/0232141 A1* | 9/2008 | Artusi ................ H02M 1/4225 363/21.01 |
| 2010/0091531 A1 | 4/2010 | Lum |
| 2010/0301908 A1* | 12/2010 | Chen ........................ G06F 1/26 327/143 |
| 2011/0057724 A1 | 3/2011 | Pabon |
| 2011/0311895 A1 | 12/2011 | Spare et al. |
| 2012/0005506 A1* | 1/2012 | Walsh ................... G06F 1/3203 713/323 |
| 2012/0166843 A1 | 6/2012 | Muralidhar et al. |
| 2016/0048188 A1* | 2/2016 | Kim ....................... G06F 1/3206 713/323 |

OTHER PUBLICATIONS

International Search Report received for PCT Patent Application No. PCT/US2017/024333, dated Jul. 13, 2017, 3 pages.

* cited by examiner

*Primary Examiner* — Albert Wang

(57) ABSTRACT

A system to provide an indication to a power supply unit that a computing device operably coupled to the power supply unit is idle. The system includes an interface including power rails to provide power from the power supply unit to the computing device and an idle control line to provide an indication from the computing device to the power supply unit that the computing device is idle.

19 Claims, 9 Drawing Sheets

Logic Flow
700

Receive power from a power supply unit (PSU).
710

Provide the power to a computing device.
720

Determine whether the computing device is in an idle state.
730

Provide an idle signal to the PSU based on a determination that the computing device is in the idle state, the idle signal to include an indication that the computing device is in the idle state.
740

FIG. 7

POWER SUPPLY INTERFACE LIGHT LOAD SIGNAL

TECHNICAL FIELD

Examples described herein are generally related to power management and particularly to power management for power supply units of computing devices.

BACKGROUND

Power supplies, and particularly, traditional desktop power supplies are not efficient at low loads. As modern computing devices trend towards low power and low load operating states, these power supplies become less efficient to operate. In fact, losses due to the power supply can account to 50% to 60% of the losses of a platform.

BRIEF DESCRIPTION OF THE DRAWINGS

FIG. 7 illustrates a second example logic flow.

DETAILED DESCRIPTION

The present disclosure provides a system including a power supply unit (PSU) and a computing device to receive current from the PSU. The PSU is configured to receive a signal from the computing device to include an indication that the computing device is in an idle state. In particular, the present disclosure provides an interface between the PSU and the computing device including an idle control line. The computing device can assert the idle control line to indicate to the PSU that the computing device is idle. The PSU can, based on receiving an indication that the computing device is idle, reduce consumption and/or increase efficiency to provide power to low loads.

Figure 1:
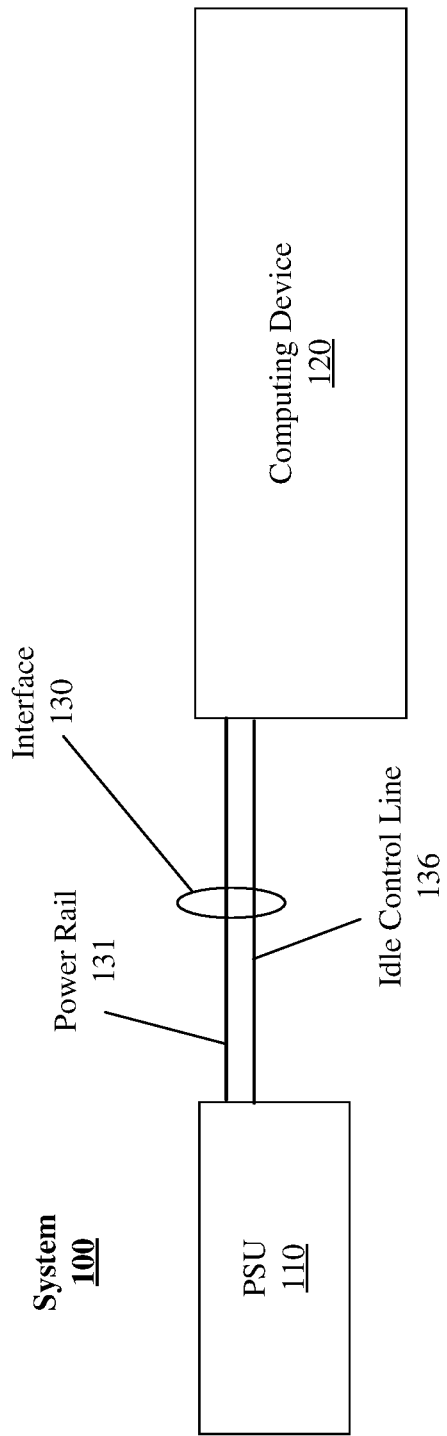
FIG. 1 illustrates an example system.

FIG. 1 illustrates an example system 100. The system 100 includes a PSU 110, a computing device 120, and an interface 130 coupling the PSU 110 and the computing device 120. In general, the PSU 110 may convert alternating current (AC) to direct current (DC) for use by the computing device 120. In particular, the PSU 110 can convert AC (e.g., from an AC power distribution line, or the like) into regulated DC. The PSU 110 can provide regulated DC power to the computing device 120 via the interface 130.

The PSU 110 can be any of a variety of PSUs to convert AC to DC. In particular, the PSU 110 can convert AC from a distribution line (e.g., 120V AC, 240V AC, or the like) into a low-voltage DC. The low-voltage DC power can be provided over the interface 130 to the computing device 120 to power the components (e.g., refer to FIG. 3) of the computing device 120. The PSU 110 can provide a number of different DC voltages. For example, the PSU 110 can provide different DC voltages (e.g., refer to FIG. 2) for different components and/or states of the computing device 120.

The PSU 110 is configured to provide an amount of power (e.g., measured in Watts, or the like) to the computing device 120. For example, the PSU 110 can be configured to provide an amount of power between 250 W and 1200 W. Furthermore, the PSU 110 may be rated to have a stated efficiency. For example, the PSU 110 may be certified to be an 80 PLUS PSU in accordance with the Generalized Internal Power Supply Efficiency Test Protocol developed by the Electric Power Research Institute. As a specific example, the PSU 110 can be an 80 PLUS bronze, silver, gold, platinum, or the like PSU. However, an efficiency of a PSU is typically rated at various loads in relation to the capacity of the PSU. For example, a PSU can have a particular efficiency at full load, at 90% of full load, at 50% of full load, or the like.

It is worthy to note, the efficiency of a PSU decreases in conjunction with the load on the PSU. For example, as the power drawn by the computing device 120 decreases, the load on the PSU 110 will also decrease. As the load on the PSU 110 decreases, the efficiency of the PSU decreases. As used herein, the term efficiency is intended to be given it's broadest interpretation. As an example, a PSU efficiency can be the amount of power delivered by the PSU over the amount of power consumed by the PSU. As a specific example, a power supply that is 90% efficient at loads above 600 W and 20% efficient at loads of below 100 W would consume 667 W of power to deliver a 600 W load and would consume 500 W to deliver a 100 W load. In some examples, the efficiency can be characterized in terms of "waste" power or "waste" heat, that is, heat or power wasted or not delivered by the PSU. Accordingly, the present disclosure provides an apparatus and technique for the computing device 120 to indicate to the PSU 110 that the computing device is idle. As such, the PSU 110 can provide power in a more efficient manner (e.g., turn off fans, turn off power supply phases, or the like).

The PSU 110 can be a PSU according to any of a variety of standards. For example, the PSU 110 can be a PSU in accordance with the advanced technology extended (ATX) standard. As a specific example, the PSU 110 can be an ATX PSU in accordance with the Design Guide for Desktop Platform Form Factors, Revision 1.31, published in 2013.

The PSU 110 is operably coupled to the computing device 120 via the interface 130. Accordingly, the interface 130 can be an interface in accordance with a variety of standards, such as, for example, the ATX standard referenced above. As such, the interface 130 can be an ATX interface.

In general, the computing device 120 can be any computing device to receive power from the PSU 110. For example, the computing device 120 can be a desktop computer, a laptop computer, a mobile device (e.g., phone, tablet, laptop, or the like) docking station, a server, a workstation, a media device, or the like. The computing device 120 can be configured to operate in a number of states, including various "idle" states or states where less power is needed to operate. This is described in greater detail below, with respect to FIG. 3. During operation, the PSU 110 can provide power to the computing device 120, via the interface 130. In particular, the PSU 110 can provide power to the computing device 120 via a power rail 131 of the interface 130. The computing device 120 can provide an idle signal to the PSU 110 via an idle control line 136, the idle signal to include an indication that the computing device 120 is in an "idle" state.

In general, the computing device 120 can send the idle signal if the load of the computing device 120 is below a threshold load. Said differently, the computing device 120 can send the idle signal if the power drawn by the computing device 120 from the PSU 110 is below a threshold amount of power. The PSU 110 can receive the idle signal (e.g., from the computing device 120) and can increase an efficiency for lower loads. For example, the PSU 110 can switch off certain portions (e.g., refer to FIG. 4) of the PSU 110 to increase efficiency at low loads. As another example, the PSU 110 can provide power on only a select number of power rails (e.g., refer to FIG. 2) on the interface 130 to increase efficiency at low loads. As another example, the PSU 110 can turn off cooling components (e.g., fans, or the like) to increase efficiency at low loads. As yet another example, the PSU 110 can turn off a number of phases of a voltage converter (e.g., refer to FIG. 4) to increase efficiency at low loads.

Figure 2:
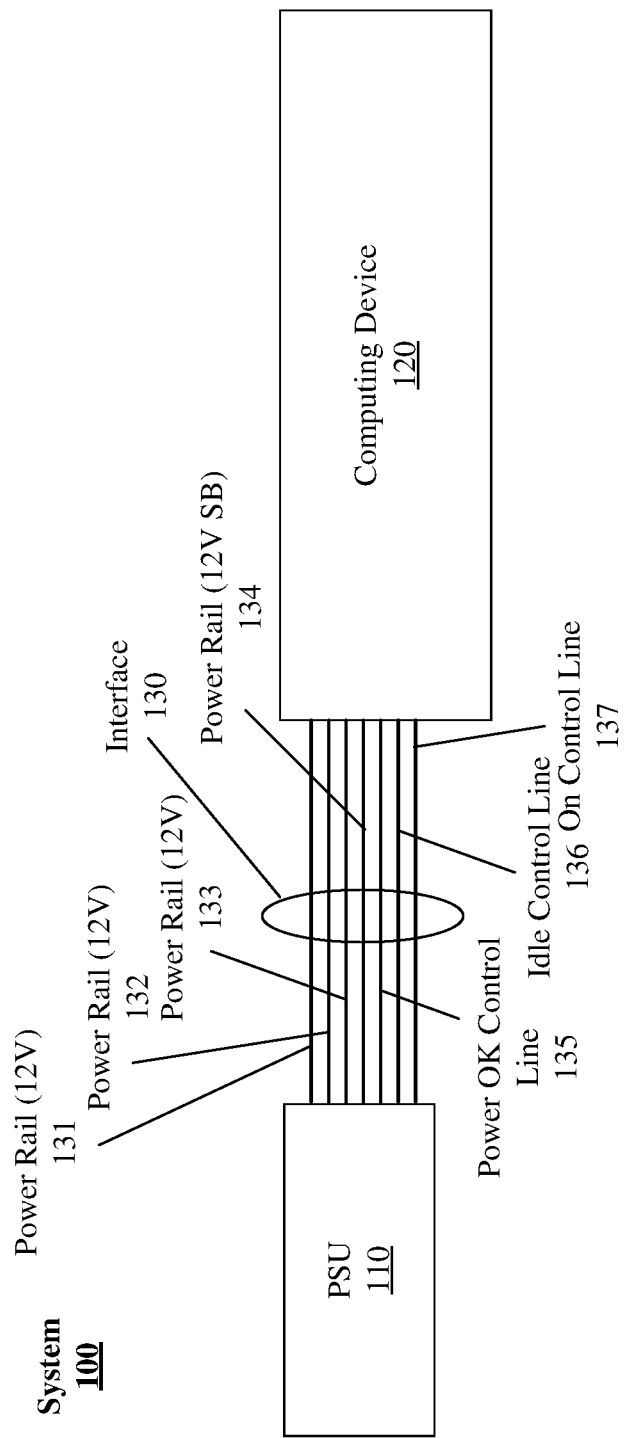
FIG. 2 illustrates an example interface of the system of FIG. 1.

FIG. 2 illustrates the example system 100 of FIG. 1 in greater detail. In particular, this figure illustrates an example implementation of the interface 130 in greater detail. As depicted, the PSU 110 is operably coupled to the computing device 120 via the interface 130. The interface 130 can be any of a variety of interfaces to provide electrical connections between the PSU 110 and the computing device 120. The interface 130 includes a number of power rails. For example, the power rail 131, power rail 132, power rail 133, and power rail 134 are depicted. In some examples, each of the power rails 131, 132, 133, and 134 can be provided to conduct a different amount of power (e.g., voltage level and current combination, or the like). For example, the PSU 110 can provide a first voltage level (e.g., 12V, or the like) on the power rail 131. Additionally, the PSU 110 can provide a second voltage level (e.g., 5V, or the like) on the power rail 132. Additionally, the PSU 110 can provide a third voltage level (e.g., 3.3V, or the like) on the power rail 133. Additionally, the PSU 110 can provide the first voltage level (e.g., 5V, or the like) but at a lower current than provided on the power rail 131 on the power rail 134, such as, for example, to provide standby power while the computing device 120 is in an off state. It is appreciated, that the interface 130 can include any number of power rails and the PSU 110 can be configured to provide any combination of voltage and current levels on the different power rails. Examples are not limited in this context.

The interface 130 can also include various control lines. For example, the interface 130 can include the idle control line 136, a power ok control line 135, and an on control line 137. The computing device 120 can assert the control lines 136 and/or 137 to provide indications to the PSU 110. For example, the computing device 120 can assert the on control line 137 to provide an indication to turn on, or to provide power on the power rails (e.g., the power rail 131, the power rail 132, and/or the power rail 133). Likewise, the computing device 120 can assert the idle control line 136 to provide an indication that the computing device 120 is in an idle state. The PSU 110 can assert the power ok control line 135 to provide an indication that the voltages on the power rails are within specified threshold levels.

Figure 3:
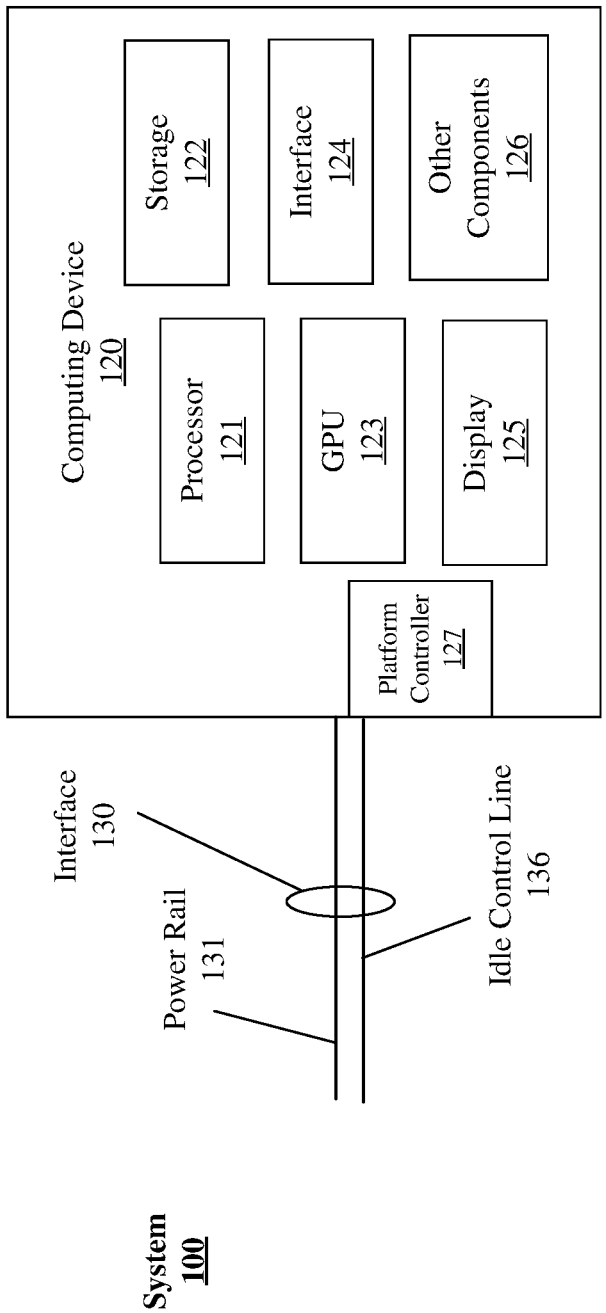
FIG. 3 illustrates an example computing device of the system of FIG. 1.

FIG. 3 illustrates a portion of the example system 100 of FIG. 1 in greater detail. In particular, this figure illustrates an example implementation of the computing device 120 in greater detail. As depicted, the computing device 120 can include at least one of a processor 121, storage 122, a graphics processing unit (GPU) 123, an interface 124, a display 125, other components 126, and a platform controller 127.

In general, the platform controller 127 can control various functions of the computing device 120, such as, for example, clocking on the processor 121, access to memory lanes, various input and output (I/O) functions, or the like. In some examples, the platform controller 127 can be a platform controller hub (PCH). In some examples, platform controller 127 can be integrated into the processor 110. The platform controller 127 is operably coupled to the idle control line 136 of the interface 130. During operation, the platform controller 127 can determine whether the computing device 120 is in an idle state and can assert the idle control line 136 to indicate to the PSU 110 that the computing device 120 is idle. For example, the processor may include a number of power modes or power states (e.g., C-States, P-States, or the like). The platform controller 127 can determine whether the processor 121 is in a particular power state (e.g., C3, C4, C5, or the like) indicative of an idle condition. As another example, the computing device itself may include various power states (e.g., S0, S1, S2, S3, S4, etc.). The platform controller 127 can determine whether the computing device 120 is in a particular power state (e.g., S1, S2, S3, or the like) indicative of an idle condition. The platform controller 127 can assert the idle control line 136 based on a determination that the computing device 120 and/or the processor 121 is in a idle state. As another the platform controller 127 can determine idle states based on one or more components of the computing device 120 (e.g., the processor 121, the storage 122, the GPU 123, the interface 124, the display 125, the other components 126, or the like).

In various embodiments, the processor 121 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, the storage 122 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although the storage is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that the storage may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the GPU 123 may include any of a wide variety of commercially available graphics processing units. Further, one or more of these graphics processing units may have dedicated memory, multiple-threaded processing and/or some other parallel processing capability.

In various embodiments, the interface 124 may employ any of a wide variety of signaling technologies enabling the components to be coupled to any of a variety of busses, networks, and/or channels. For example, the interface 124 can be implemented to couple the computing device 120 (e.g., the processor 121, the storage 122, or the like) using electrically and/or optically conductive cabling. The interface 124 may employ signaling and/or protocols conforming to any of a variety of industry standards, including without limitation, RS-232C, RS-422, USB, Ethernet (IEEE-802.3) or IEEE-1394. Alternatively or additionally, where the interface 124 is implemented to use wireless signal transmission, the interface 124 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

In various embodiments, the display 125 can include any of a variety of types of display devices including and not limited to a liquid crystal display (LCD), an electroluminescent (EL) display, a plasma display, etc. Further, it should be noted that the controls and the display might be combined into a single component such as a touchscreen display.

In various embodiments, the other components 126 can include any of a variety of components implemented in the computing device 120, such as, for example, control components (e.g., keyboard, joystick, mouse, trackpad, stylus, touch device, or the like), cameras (e.g., video cameras, still cameras, or the like), output devices (e.g., speakers, printers, or the like).

Figure 4:
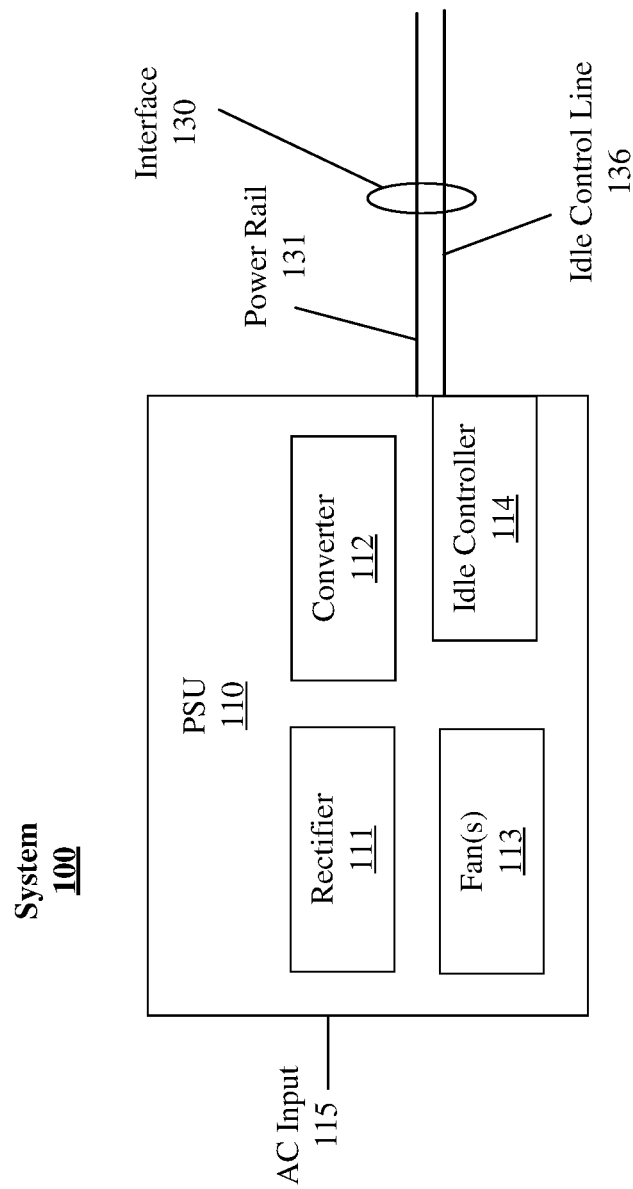
FIG. 4 illustrates an example power supply unit of the system of FIG. 1.

FIG. 4 illustrates a portion of the example system 100 of FIG. 1 in greater detail. In particular, this figure illustrates an example implementation of the PSU 110 in greater detail. As depicted, the PSU 110 can include at least one of a rectifier 111, a converter 112, fan(s) 113, and an idle controller 114.

In general, the rectifier 111 can rectify an AC input voltage (e.g., AC input 115, or the like) into a DC voltage. The rectifier 111 may rectify the AC input voltage to produce unregulated DC voltage. The rectifier 111 can comprise a filter (e.g., an EMI (electromagnetic interference) filter, or the like) to filter out interference in the AC input voltage 115 and/or reduce harmonics in the AC input current. The converter 112 can convert the rectified DC voltage into a number of DC voltages (e.g., for power rails 131, 132, 133, and/or 134, or the like). The fan(s) 113 can be implemented to provide cooling to the PSU 110. In particular, the fan can provide that heat generated by the rectifier 111 and/or the converter 112 is dissipated appropriately.

The idle controller 114 can receive an indication (e.g., via the idle control line 136, or the like) that the load (e.g., computing device 120, or the like) coupled to the PSU 110 is idle. In particular, the idle controller 114 can receive the idle control signal from the platform controller 127 via the idle control line 136. The idle controller 114 can cause the PSU 110 to operate to improve efficiency for low loads. For example, the idle controller 114 can turn off the fan(s) 113. In some examples, the converter 112 can be a multi-phase converter. As such, the idle controller 114 can turn off one or more phases of the converter 112 to increase efficiency at low loads.

Figure 5:
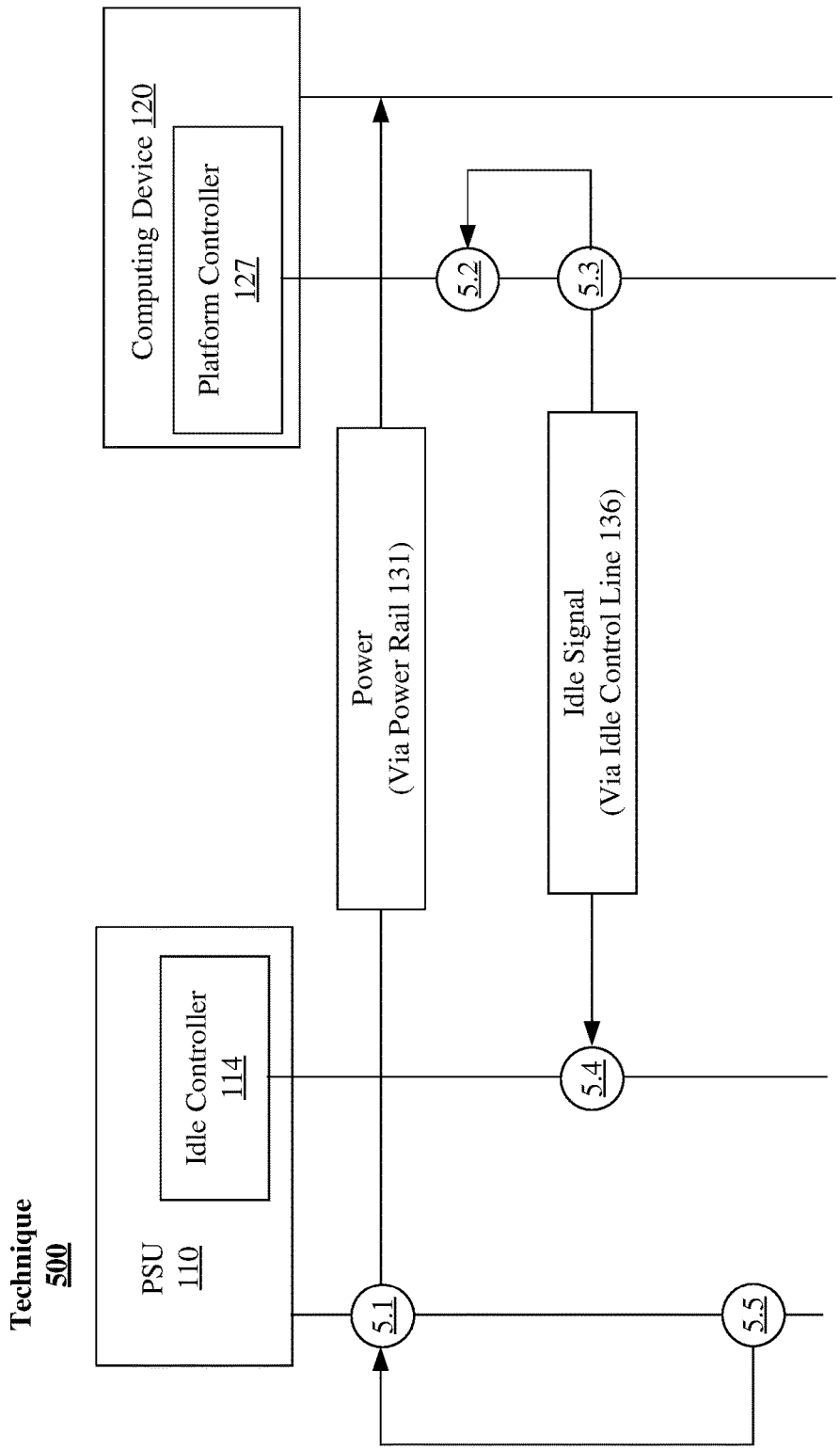
FIG. 5 illustrates an example technique.

FIG. 5 depicts a technique 500 to increase efficiency of a PSU at low loads. The technique 500 is depicted in conjunction with the system 100 of FIG. 1. However, this is done for convenience and clarity. In particular, the technique 500 can be implemented by any of a variety of different power supplies of computing devices to increase efficiency of the power supply at low loads.

The technique 500 can begin at block 5.1. At block 5.1, the PSU 110 can provide power (e.g., DC at a specified voltage, or the like) to the computing device 120. In particular, the PSU 110 can provide power via the power rails 131, 132, 133, and/or 134 of the interface 130.

Continuing to block 5.2, the platform controller 127 can determine whether the computing device 120 is in an idle state. For example, the platform controller 127 can determine whether a processor (e.g., the processor 121, or the like) of the computing device 120 is in a specific mode (e.g. C-state, or the like) indicative of an idle condition. As another example, the platform controller 127 can determine whether components (e.g., the storage 122, the GPU 123, or the like) of the computing device 120 are idle.

Continuing to block 5.3, the platform controller 127 can send an idle control signal to the PSU 110 to indicate that the computing device 120 is in an idle state. In particular, the platform controller 127 can send the idle control signal via the idle control line 136 of the interface 130. Continuing to block 5.4, the idle controller 114 can receive an idle control signal indicating that a computing device (e.g., the computing device 120, or the like) is in an idle state.

Continuing to block 5.5, the idle controller 114 can reducing a power consumption of the PSU 110 based on receiving the idle control signal. In particular, the idle controller 114 can increase an efficiency of the PSU 110 at low loads. For example, the idle controller 114 can turn off fans (e.g., fans 113, or the like) or turn off phases (e.g., phases of the converter 112, or the like) of the power supply.

It is worthy to note, the technique 500 can be performed iteratively. In particular, the computing device 120 (e.g., the platform controller 127, or the like) can repeatedly send the assert and/or de-assert the idle control line 136 to indicate to the PSU 110 whether the computing device 120 is idle or not. Likewise, the PSU 110 can periodically implement low load efficiency measures and/or or techniques to increase an efficiency of the PSU 110 during periods where the computing device 120 is idle, and therefore drawing low power compared to normal (non-idle) operation.

Figure 6:
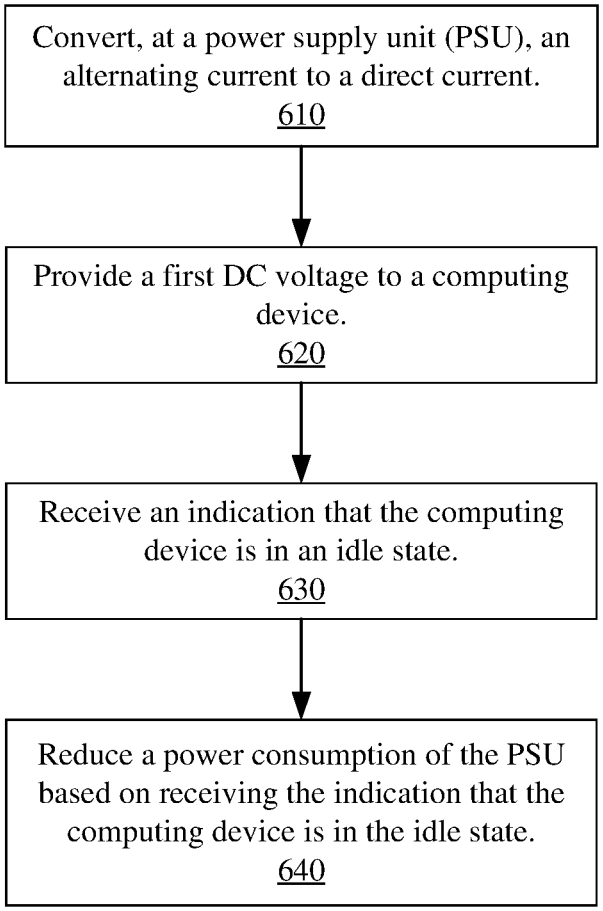
FIG. 6 illustrates a first example logic flow.

FIGS. 6-7 illustrate block diagrams of example logic flows 600 and 700, respectively. The logic flows 600 and 700 can be implemented by the system 100 to increase an efficiency of the system 100. In particular, the PSU 110 can implement logic flow 600 while the computing device 120 implements logic flow 700. The logic flows 600 and 700 are described with respect to the system 100 of FIG. 1. However, it is worthy to note that the logic flows can be implemented by a PSU and computing device having alternate arrangements than depicted in FIG. 1. Examples are not limited in this context.

Turning more specifically to FIG. 6 and the logic flow 600. The logic flow 600 can begin at block 610. At block 610 "convert, at a power supply unit (PSU), an alternating current to a direct current," the PSU can convert AC (e.g., from the AC input line 115, or the like) to DC. In particular, the rectifier 112 and converter 112 can convert AC to DC. Continuing to block 620 "provide a first DC voltage to a computing device," the PSU 110 can provide a DC voltage to the computing device 120. For example, the PSU 110 can provide a DC voltage, via power rail 131, 132, 133, and/or 134, to the computing device 120.

Continuing to block 630 "receive an indication that the computing device is in an idle state," the idle controller 114 receive an indication of whether the computing device 120 is in an idle state. For example, the idle controller 114 can receive an indication of whether the the computing device 120 is idle based on whether the idle control line 136 of the interface 130 indicates (e.g., asserted high, asserted low, or the like) that the computing device 120 is idle.

Continuing to block 640 "reduce a power consumption of the PSU based on receiving the indication that the computing device is in the idle state," the idle controller 114 can reduce the power consumption of the PSU 110. For example, the idle controller 114 can increase the efficiency of the PSU 110 at low loads. For example, the idle controller 114 can turn off fans (e.g., fans 113, or the like) or turn off phases (e.g., phases of the converter 112, or the like) of the power supply.

Turning more specifically to FIG. 7 and the logic flow 700. The logic flow 700 can begin at block 710. As block 710 "receive power from a power supply unit (PSU)," the computing device 120 can receive power from the PSU 110. In particular, the computing device 120 can receive power from the PSU 110 via power rails 131, 132, 133, and/or 134 of the interface 130. Continuing to block 720 "provide the received power to a computing device," the received power can be provided to the computing device 120. More specifically, the received power can be provided to a component of the computing device (e.g., the processor 121, the storage 122, the GPU 123, the interface 124, the display 125, other components 126, or the like).

Continuing to block 730 "determine whether the computing device is in an idle state," the platform controller 127 can determine whether the computing device 120 is in an idle state. For example, the platform controller 127 can determine whether a processor (e.g., the processor 121, or the like) of the computing device 120 is in a specific mode (e.g. C-state, or the like) indicative of an idle condition. As another example, the platform controller 127 can determine whether components (e.g., the storage 122, the GPU 123, or the like) of the computing device 120 are idle.

Continuing to block 740 "provide an idle signal to the PSU based on a determination that the computing device is in the idle state, the idle signal to include an indication that the computing device is in the idle state," the platform controller 127 can provide an idle signal to the PSU 110. In particular, the platform controller 127 can assert the idle control line 136 of the interface 130 to indicate to the PSU 110 that the computing device 120 is in an idle state.

Figure 8:
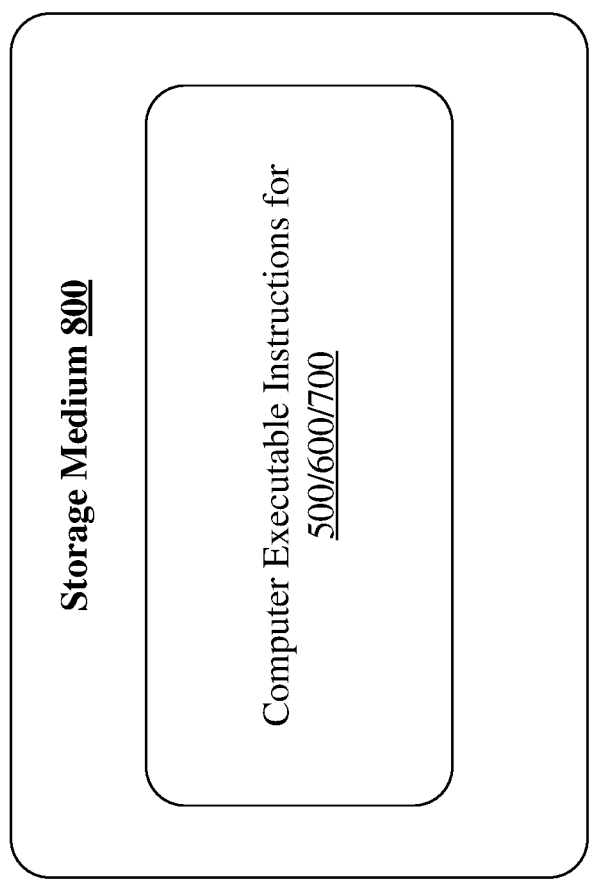
FIG. 8 illustrates an example of a storage medium.

FIG. 8 illustrates an example storage medium 800. As shown in FIG. 8, the storage medium includes a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement technique 500, logic flow 600 and/or logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
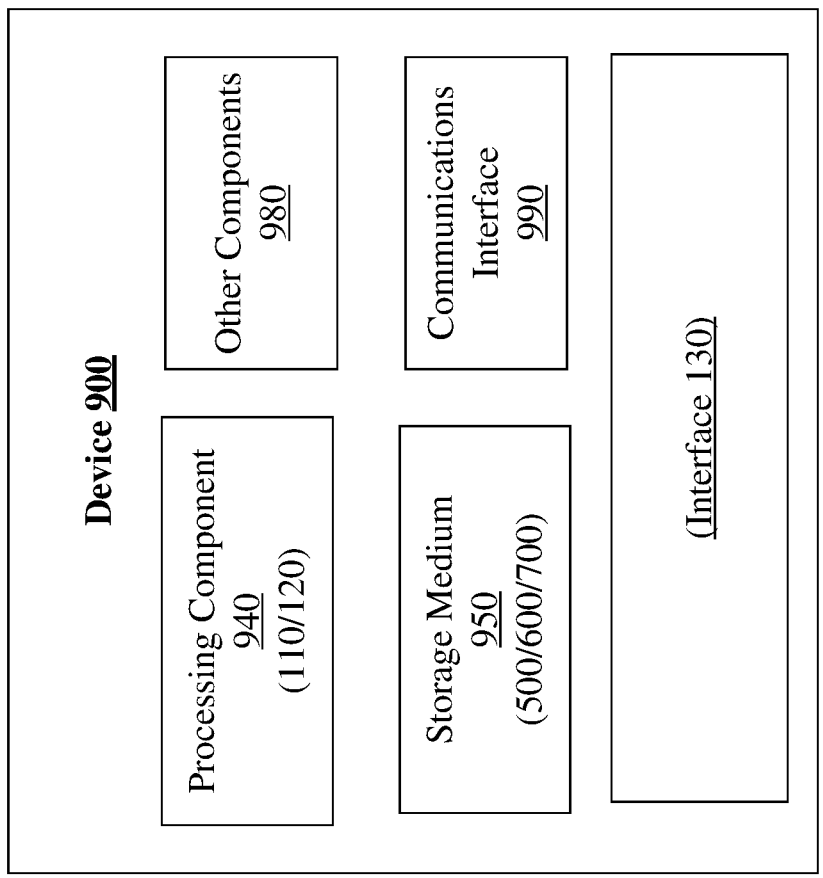
FIG. 9 illustrates an example device.

FIG. 9 illustrates an example device 900. In some examples, as shown in FIG. 9, computing platform 900 may include a processing component 910, storage medium 950, other components 980, or a communications interface 990.

According to some examples, processing component 910 may execute processing operations or logic for PSU 110 and/or computing device 120. Processing component 910 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

According to some examples, storage medium 950 may include memory units to store instructions to execute processing operations or logic for technique 500, logic flow 600 and/or logic flow 700. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory or any other type of storage media suitable for storing information.

In some examples, other components 980 may include common computing elements or circuitry, such as one or more processors, multi-core processors, co-processors, memory units, interfaces, oscillators, timing devices, and so forth.

In some examples, communications interface 990 may include logic and/or features to support a communication interface. For these examples, communications interface 990 may include one or more communication interfaces that operate according to various communication protocols or standards to communicate over communication links or channels. Communications may occur via use of communication protocols or standards described in one or more industry standards (including progenies and variants) such as those associated with the PCI Express, SATA, SAS (Serial Attached SCSI) standard or specifications.

The components and features of device 900 may be implemented using any combination of discrete circuitry, application specific integrated circuits (ASICs), logic gates and/or single chip architectures. Further, the features device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example device 900 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The following examples of the present disclosure are provided.

Example 1

A system comprising: a power supply unit (PSU); a computing device to receive power from the PSU; and an interface to couple the PSU and the computing device, the computing device to provide, via the interface, an indication to the PSU that the computing device is in an idle state.

Example 2

The system of example 1, the computing device to receive power from the PSU via the interface.

Example 3

The system of example 2, the interface comprising a first one voltage line and an idle control line, the computing device to provide the indication to the PSU that the computing device is in the idle state via the idle control line.

Example 4

The system of example 3, the interface comprising a second voltage line, the second voltage line to provide less power than the first voltage line.

Example 5

The system of example 4, the PSU comprising an advanced technology extended (ATX) PSU or a balanced technology extended PSU.

Example 6

The system of example 5, the computing device to comprise a platform controller hub (PCH), the PCH to determine whether the computing device in the idle state and to provide an idle signal on the idle control line to indicate that the computing device is in the idle state.

Example 7

The system of example 6, the computing device comprising a processor having a plurality of C-States, the PCH to determine whether the processor is in a selected one of the plurality of C-States and to provide the idle signal on the idle control line based on a determination that the processor is in the selected one of the plurality of C-States.

Example 8

The system of example 6, the comprising device comprising a peripheral device operably coupled to the second voltage line, the PCH to determine whether the peripheral device is in an idle state and to provide the idle signal on the idle control line based on a determination that the peripheral device is in the idle state.

Example 9

The system of example 8, wherein the peripheral comprises a graphics processing unit, a peripheral component interface (PCI) device, or a PCI express (PCIe) device.

Example 10

The system of example 4, the interface comprising a twenty four pin interface advanced technology extended interface, the idle control line corresponding to a twentieth pin of the twenty four pin interface.

Example 11

The system of example 4, the PSU comprising a switching power supply circuit, the PSU to configure to switching power supply circuit to only provide power on the first voltage line or the second voltage line based on receiving the indication that the computing device is in the idle state.

Example 12

The system of example 1, the PSU comprising a fan, the PSU to turn off the fan or to reduce a speed of the fan based on receiving the indication that the computing device is in the idle state.

Example 13

The system of example 1, the PSU comprising a voltage converter having a plurality of phases, the PSU to turn off at least one of the plurality of phases based on receiving the indication that the computing device is in the idle state.

Example 14

A power supply unit, comprising: a voltage converter to convert an alternating current to a direct current and to provide a first DC voltage on a first power line and a second DC voltage on a second DC power line; and an idle controller to receive an indication that a computing device operably coupled to the first power line is in an idle state and to configure the voltage converter to only provide the second DC voltage on the second DC power line.

Example 15

The power supply unit of example 14, comprising an interface connector, the interface connection comprising a first pin corresponding to the first power line, a second pin corresponding to the second power line, and a third pin to receive the indication that the computing device is in the idle state.

Example 16

The power supply unit of example 15, the interface connector an advanced technology extended (ATX) PSU interface connector or a balanced technology extended PSU interface connector.

Example 17

The power supply unit of example 14, comprising a fan, the idle controller to turn off the fan or to reduce a speed of the fan based on receiving the indication that the computing device is in the idle state.

Example 18

The power supply unit of example 14, the voltage converter having a plurality of phases, the idle controller to turn off at least one of the plurality of phases based on receiving the indication that the computing device is in the idle state.

Example 19

A computing device comprising: a processor having a plurality of C-states, the processor to receive power from a power supply unit (PSU); and a platform controller hub (PCH) operably coupled to the PSU, the PCH to: determine whether the computing device in a select one of the plurality of C-states; and provide an idle signal to the PSU, the idle signal to include an indication that the computing device is in an idle state.

Example 20

The computing device of example 19, comprising an interface connector to operably couple the computing device to the PSU.

Example 21

The computing device of example 20, the interface connector an advanced technology extended (ATX) PSU interface connector or a balanced technology extended PSU interface connector.

Example 22

The computing device of example 19, comprising a peripheral device, the PCH to determine whether the peripheral is in an idle state and to provide the idle signal to the PSU based on a determination that the peripheral device is in the idle state.

Example 23

The computing device of example 22, wherein the peripheral device comprises a graphics processing unit, a peripheral component interface (PCI) device, or a PCI express (PCIe) device.

Example 24

A method comprising: converting, at a power supply unit (PSU), an alternating current to a direct current; providing a first DC voltage to a computing device; receiving an indication that the computing device is in an idle state; and reducing a power consumption of the PSU based on receiving the indication that the computing device is in the idle state.

Example 25

The method of example 24, the PSU comprising a fan, the method comprising turning off the fan or reducing a speed of the fan to reduce a power consumption of the PSU.

Example 26

The method of example 24, the PSU comprising a plurality of phases, the method comprising turning off at least one of the plurality of phases to reduce a power consumption of the PSU.

Example 27

A method comprising: receiving power from a power supply unit (PSU); providing the received power to a computing device; determining whether the computing device is in an idle state; and providing an idle signal to the PSU based on a determination that the computing device is in the idle state, the idle signal to include an indication that the computing device is in an idle state.

Example 28

The method of example 27, the computing device comprising a processor having a plurality of C-states, the method comprising: determining whether the processor is in a select one of the plurality of C-states; and providing an idle signal to the PSU based on a determination that the processor is in the select one of the plurality of C-states, the idle signal to include an indication that the computing device is in an idle state.

Example 29

The method of example 27, comprising: determining whether a peripheral device of the computing device is in an idle state; and providing the idle signal to the PSU based on a determination that the peripheral device is in the idle state.

Example 30

The method of example 29, wherein the peripheral device comprises a graphics processing unit, a peripheral component interface (PCI) device, or a PCI express (PCIe) device.

Example 31

An apparatus comprising formed from the method of any one of examples 24 to 30.

Example 32

At least one machine readable medium comprising a plurality of instructions that in response to be executed by a power supply or a computing device cause the power supply or the computing device to carry out a method according to any one of examples 24 to 30.

Example 33

At least one machine readable medium comprising a plurality of instructions that in response to being executed by power supply unit (PSU) controller cause the PSU controller to: send a control signal to a converter of the PSU to include an indication to convert an alternating current to a direct current; provide a first DC voltage to a computing device; receive an indication that the computing device is in an idle state; and reduce a power consumption of the PSU based on receiving the indication that the computing device is in the idle state.

Example 34

The at least one machine readable medium of example 33, the PSU comprising a fan, the instructions to further cause the PSU controller to turn off the fan or reduce a speed of the fan to reduce a power consumption of the PSU.

Example 35

The at least one machine readable medium of example 33, the PSU comprising a plurality of phases, the instructions to further cause the PSU controller to turn off at least one of the plurality of phases to reduce a power consumption of the PSU.

Example 36

At least one machine readable medium comprising a plurality of instructions that in response to being executed by platform controller hub (PCH) cause the PCH to: receiving a control signal from a processor of a computing device, the control signal to include an indication that the computing device is in an idle state; provide an idle signal to a PSU operably coupled to the computing device based on a determination that the computing device is in the idle state, the idle signal to include an indication that the computing device is in an idle state.

Example 37

The at least one machine readable medium of example 36, the processor having a plurality of C-states, the control signal to include an indication that the processor is in a selected one of the plurality of C-states, the instructions to further cause the PCH to provide an idle signal to a PSU operably coupled to the computing device based on a determination that the processor is in the selected one of the plurality of C-states.

Example 38

The at least one machine readable medium of example 37, the instructions to further cause the PCH to: determine whether a peripheral device of the computing device is in an idle state; and provide the idle signal to the PSU based on a determination that the peripheral device is in the idle state.

Example 39

The at least one machine readable medium of example 38, wherein the peripheral device comprises a graphics processing unit, a peripheral component interface (PCI) device, or a PCI express (PCIe) device.

What is claimed is:
1. A system comprising:
a power supply unit (PSU) comprising a voltage converter having a plurality of phases;
a computing device comprising a processor; and
an interface to couple the PSU and the computing device, the interface comprising at least one voltage line, an idle control line and an on control line,
the PSU to provide power to the computing device, via one or more of the at least one voltage lines, responsive to receiving an indication to turn on from the computing device via the on control line,
the computing device to provide, via the idle control line, an indication to the PSU that the computing device is in an idle state based on a C-State of the processor; and
the PSU to selectively turn off one of the plurality of phases of the voltage converter based on the indication that the computing device is in the idle state.

2. The system of claim 1, the one of more voltage lines comprising a first voltage line and a second voltage line, the second voltage line to provide less power than the first voltage line.

3. The system of claim 2, the PSU comprising an advanced technology extended (ATX) PSU or a balanced technology extended PSU.

4. The system of claim 3, the computing device to comprise a platform controller hub (PCH), the PCH to determine whether the computing device in the idle state and to provide an idle signal on the idle control line to indicate that the computing device is in the idle state.

5. The system of claim 4, the processor having a plurality of C-States, the PCH to determine whether the processor is in a selected one of the plurality of C-States and to provide the idle signal on the idle control line based on a determination that the processor is in the selected one of the plurality of C-States.

6. The system of claim 4, the computing device comprising a peripheral device operably coupled to the second voltage line, the PCH to determine whether the peripheral device is idle and to provide the idle signal on the idle control line based on a determination that the peripheral device is idle.

7. The system of claim 6, wherein the peripheral device comprises a graphics processing unit, a peripheral component interface (PCI) device, or a PCI express (PCIe) device.

8. The system of claim 2, the interface comprising a twenty four pin interface advanced technology extended interface, the idle control line corresponding to a twentieth pin of the twenty four pin interface.

9. The system of claim 2, the PSU comprising a switching power supply circuit, the PSU to configure to switching power supply circuit to only provide power on the first voltage line or the second voltage line based on receiving the indication that the computing device is in the idle state.

10. The system of claim 1, the PSU comprising a fan, the PSU to turn off the fan or to reduce a speed of the fan based on receiving the indication that the computing device is in the idle state.

11. A power supply unit (PSU), comprising:
an interface connector comprising a first pin corresponding to a first power line, a second pin corresponding to a second power line, a third pin corresponding to an idle control line, and a fourth pin corresponding to a power on line;
a voltage converter to convert an alternating current to a direct current and to provide a first DC voltage on the first power line and a second DC voltage on the second power line, the voltage converter having a plurality of phases;
a power controller to receive an indication that a computing device coupled to the PSU via the interface is on, and responsive to the indication, provide the first DC voltage on the first power line and the second DC voltage on the second power line, the computing device comprising a processor; and an idle controller to receive, via the idle control line, an indication that the processor is in an idle state based on a C-State of the processor, the idle controller to configure the voltage converter to only provide the second DC voltage on the second DC power line based on the indication, and to selectively turn off one of the plurality of phases of the voltage converter based on the indication.

12. The power supply unit of claim 11, the interface connector an advanced technology extended (ATX) PSU interface connector or a balanced technology extended PSU interface connector.

13. The power supply unit of claim 11, comprising a fan, the idle controller to turn off the fan or to reduce a speed of the fan based on receiving the indication that the computing device is in the idle state.

14. A method comprising:
receiving, via an interface at a power supply unit (PSU), a power on signal from a computing device coupled to the PSU, the PSU comprising a voltage converter having a plurality of phases, the interface comprising at least one voltage line, an idle control line and an on control line, the power received via one or more of the at least one voltage lines, the power on signal received via the on control line;
providing, responsive to the power on signal, power to the computing device via one or more of the at least one voltage lines, the computing device comprising a processor;
receiving, via the idle control line, an indication that the processor is in an idle state; and
selectively turning of one of the plurality of phases of the voltage converter based on the indication that the computing device is in the idle state to provide a reduced current on the one or more of the at least one voltage lines.

15. The method of claim 14, the processor having a plurality of C-states, the method comprising:
determining whether the processor is in a select one of the plurality of C-states; and
providing the idle signal to the PSU based on a determination that the processor is in the select one of the plurality of C-states.

16. The method of claim 14, comprising:
determining whether a peripheral device of the computing device is idle; and
providing the idle signal to the PSU based on a determination that the peripheral device is idle.

17. The method of claim 16, wherein the peripheral device comprises a graphics processing unit, a peripheral component interface (PCI) device, or a PCI express (PCIe) device.

18. At least one non-transitory machine readable medium comprising a plurality of instructions that in response to being executed by a power supply unit (PSU) controller cause the PSU controller to:
receive, via an interface at the power supply unit (PSU), a power on signal from a computing device coupled to the PSU, the PSU comprising a voltage converter having a plurality of phases, the interface comprising at least one voltage line, an idle control line and an on control line, the power received via one or more of the at least one voltage lines, the power on signal received via the on control line;
send, responsive to the power on signal, a control signal to the voltage converter to include an indication to convert an alternating current to a direct current;
provide, responsive to the power on signal, a first DC voltage to the computing device via one or more of the at least one voltage lines, the computing device comprising a processor;
receive, via the idle control line, an idle control signal comprising an indication that the computing device is in an idle state based on a C-State of the processor; and
selectively turn off one of the plurality of phases of the voltage converter responsive to the idle control signal, to reduce a power consumption of the PSU and to provide a reduced current for the first DC voltage provided on the one or more of the at least one voltage lines.

19. The at least one non-transitory machine readable medium of claim 18, the PSU comprising a fan, the instructions to further cause the PSU controller to turn off the fan or reduce a speed of the fan to reduce a power consumption of the PSU.

* * * * *